US 6,817,114 B2

(12) United States Patent
Bredael

(10) Patent No.: US 6,817,114 B2
(45) Date of Patent: Nov. 16, 2004

(54) S-B-S COMPOSITIONS

(75) Inventor: Pierre Bredael, Brussels (BE)

(73) Assignee: Atofina Research S.A., Feluy (BE)

( * ) Notice: Subject to any disclaimer, the term of this patent is extended or adjusted under 35 U.S.C. 154(b) by 55 days.

(21) Appl. No.: 10/181,088

(22) PCT Filed: Jan. 11, 2001

(86) PCT No.: PCT/EP01/00271

§ 371 (c)(1), (2), (4) Date: Sep. 30, 2002

(87) PCT Pub. No.: WO01/51542

PCT Pub. Date: Jul. 19, 2001

(65) Prior Publication Data

US 2003/0134985 A1 Jul. 17, 2003

(30) Foreign Application Priority Data

Jan. 12, 2000 (EP) ............................................. 00100571

(51) Int. Cl.$^7$ ................................................ A43B 1/14
(52) U.S. Cl. ................................ 36/87; 36/89; 525/88; 525/89; 525/105
(58) Field of Search ....................... 36/87, 89; 525/88, 525/89, 105

(56) References Cited

U.S. PATENT DOCUMENTS

| | | | | |
|---|---|---|---|---|
| 3,281,383 A | * | 10/1966 | Zelinski et al. | .............. 525/122 |
| 4,091,053 A | * | 5/1978 | Kitchen | ....................... 525/98 |
| 4,107,124 A | | 8/1978 | Himes | |
| 4,925,899 A | | 5/1990 | Rendina et al. | |
| 5,264,489 A | | 11/1993 | Lanza et al. | |
| 5,412,031 A | | 5/1995 | Ma et al. | |
| 5,451,619 A | | 9/1995 | Kluttz et al. | |
| 5,539,058 A | | 7/1996 | Nicol | |
| H1597 H | | 9/1996 | Erickson | |
| 5,718,752 A | | 2/1998 | Kluttz | |
| 5,886,113 A | * | 3/1999 | Hsieh et al. | ................... 526/86 |
| 6,235,817 B1 | | 5/2001 | Haveaux et al. | |

FOREIGN PATENT DOCUMENTS

EP  0 611 787 A1  8/1994

* cited by examiner

Primary Examiner—Philip Tucker
Assistant Examiner—D. Aylward
(74) Attorney, Agent, or Firm—William D. Jackson

(57) ABSTRACT

Use of compositions prepared with organic coupling agents carrying epoxy groups for preparing applications requiring simultaneously improved mechanical properties and low viscosity.

16 Claims, No Drawings

S-B-S COMPOSITIONS

The present invention relates to styrene-butadiene-styrene compositions coupled with organic coupling agents carrying epoxy groups, and their use for various applications such as for example roofing, binders for road coverage or footwear compounds.

The bituminous compositions of the prior art, when used for roofing or waterproofing membranes suffer from major drawbacks; either the high temperature properties are improved at the expense of the low temperature properties, or if both ends of the temperature spectrum yield acceptable performances, the viscosity will be very; high, requiring that special equipment be used for handling the bituminous composition.

It is moreover well-known that the residue of the coupling agent remains in the copolymer formed and is thus capable of leaving toxic residues or other unwanted products in the polymers, which may be troublesome in certain uses. This phenomenon is particularly important with silicon tetrachloride ($SiCl_4$) as coupling agent. Indeed, when $SiCl_4$ is used as coupling agent, it is noted that lithium chloride (LiCl) is formed as by-product. The presence of LiCl is detrimental to the optical properties of copolymers and favours the thermal ageing of these copolymers.

It is known to improve the physical properties of bituminous compositions by incorporating elastomeric bock copolymers generally represented by the formula $(S-B)_nY$ wherein Y is the residue of a polyfunctional coupling agent, (S-B) represents a single arm constituted of a polydiene block B and a polyvinyl aromatic end block S. and n represents the number of arms (S-B).

The coupling agents can be selected from among polyvinyl aromatic compounds, polyepoxides, polyisocyanates, polyamines, polyaldehydes, polyhalides, polyanhydrides, polyketones, polyepoxyesters and polyesters. Combinations of different kinds of coupling agents may also be used.

Among the several polyfunctional agents of coupling available on the market, those of small residual toxicity have been preferred. For example, EP-B-344140 discloses the use of polyfunctional coupling agents of the general formula $SiX_nR_{4-n}$ wherein X is a halogen, preferably Cl, R is an alkyl, cycloalkyl or aryl radical, preferably methyl, ethyl and/or phenyl and n is an integer from 2 to 4. The most frequently used coupling agent is $SiCl_4$.

It is also known to use organic coupling agents carrying epoxy groups. Polymers of epoxidised hydrocarbons are used such as epoxidised liquid polybutadiene or epoxidised vegetable oils such as epoxidised soybean oil and epoxidised linseed oil. Each epoxy can be coupled to a chain. The number of coupling sites is undetermined and can vary according to the number of epoxy groups: it is at least 3 and preferably, it is from 4 to 6. However, the styrene-butadiene-styrene (S-B-S) compositions obtained with epoxidised triglyceride esters, sold under the name of Vikoflex, have never been used for commercial applications wherein good mechanical properties combined with low viscosity are required.

It is an object of the present invention to use organic coupling agents carrying epoxy groups in order to prepare products combining improved mechanical properties and low viscosity.

It is another object of the present invention to use organic coupling agents carring epoxy groups in order to provide improved roofing compositions.

It is a further object of the present invention to use organic coupling agents carrying epoxy groups in order to provide improved binders for road coverage applications.

It is yet a further object of the present invention to use organic coupling agents carrying epoxy groups in order to produce improved thermoplastic compounds.

The resinous thermoplastic block polymers used in the present invention are of the radially branched type with at least 3 arms. The arms of each branch are composed of substantially pure homopolymeric blocks of polymonovinylarene represented by S and polyconjugated diene represented by B.

Preferably, in the process of polymerisation used for preparing the products of the present invention, a block base copolymer is prepared by the following steps:

1) A first block of vinylaromatic monomer is polymerised to form a first block S.
2) The polymerisation is carried out at a temperature of from 20 to 60° C., for a period of about 20 minutes, in the presence of an organolithium compound as a catalyst, and in the presence of a solvent that is an inert hydrocarbon.
3) When all the vinylaromatic monomer has been polymerised, a monomer of a conjugated diene is introduced into the solution. This monomer starts reacting entirely at the living ends of the chains to give a block copolymer of the type S-B-Li, in which B represents the conjugated diene block.

The vinylaromatic compound which constitutes the block S of the block copolymer can be styrene, vinyltoluene, vinylxylene or vinylnaphtalene or a mixture thereof.

The conjugated dienes employed ordinarily are those of 4 to 12 carbon atoms per molecule, with those of 4 to 8 carbon atoms preferred for availability. Such monomers include 1,3-butadiene, isoprene, 2,3-dimethyl-1,3-butadiene, piplerylene, 3-butyl-1,3-octadiene, 2-phenyl-1,3-butadiene, and the like. The monovinylarenes employed ordinarily contain 8 to 20, more conveniently 8 to 12 carbon atoms per molecule, including such as styrene, $\alpha$-methylstyrene, 1-vinyinaphtalene,2-vinyinaphtalene, as well as alkyl, cycloalkyl, aryl, alkaryl, and aralkyl derivatives thereof in which the total number of carbon atoms in the combined substituents generally is not greater than 12. Examples of sustituted monomers include 3-methylstyrene, 4-n-propylstyrene, 4-cyclohexylstyrene, 4-dodecylstyrene, 3-ethyl-4-benzylstyrene, 4-p-tolystyrene, or 4-(4-phenyl-n-butyl)styrene.

The catalyst is generally an alkyllithium, which may be branched such as those of secondary alkyl radicals, having 3 to 8 carbon atoms. However, n- and s-butyllithium are preferably used for reasons of ease of procurement and storage stability. The solvents used are generally paraffinic, cycloparaffinic and aromatic hydrocarbons and their mixtures. Examples are n-pentane, n-hexane, n-heptane, 2,2,4-trimethylpentane, cyclohexane, cyclopentane, benzene, toluene and xylene. A polar solvent, such as cyclic esters (THF) or acyclic ethers or tertiary amines, can be incorporated in order to obtain the formation of a specific polymeric microstructure, such as, for example, an increased amount of vinyl units, as well as random S/B blocks.

The peak molecular weight Mp of the base copolymer was measured by conventional Gel Permeation Chromatography (GPC) technique. The peak molecular weight Mp, so determined, varies within wide limits and is generally from 40000 to 120000 and preferably from 60000 to 80000, the polyvinylaromatic block representing from 15 to 45% by weight of the base copolymer. When this stage of the process has been reached, polymeric chains of the type S-B-Li have been formed.

The operating conditions for the GPC technique were as follows: the temperature was 23° C., the solvent was THF and there were 5 columns in series containing ultrastyragel with pore openings ranging from 500 to 1000000 A. The solvent debit was 1 ml/min and there was a U.V. detector in series with a refraction index detector. 200 microliters of the products to be analysed, at a concentration of 0.1% in THF, were injected. The internal standard was 0.01% of tertiobutyl hydroxy toluene (THB) and the calibration was achieved using the Mark and Houwink equation in which k=1.251E-4 and α=0.717. The calculations were based upon the refraction index detector and the styrene percentage was defined by the U.V. detector.

The block base copolymer terminated by a lithium atom, called the living base polymer, is then reacted with at least one coupling agent comprising at least 3 epoxy groups per mole, preferably at a rate of 0.2 to 0.75 parts per hundred parts of the total polymers obtained by coupling.

The polyfunctional treating agent is added to the polymerisation mixture under reaction conditions sufficient to form branched copolymers containing both the elastomeric and non-elatomeric blocks. Thus the polyfunctional, treating agent is added to the polymerisation mixture after the polymerisation has been essentially completed but prior to deactivation of the polymerisation initiator because it must be able of forming branched polymer by reacting with active terminal lithium atoms of the living polymer.

The styrenic content of the product is from 15 to 45 weight percent, preferably from 35 to 39 weight percent, and its peak molecular weight Mp as measured by conventional GPC technique is from 80000 to 400000, preferably from 320,000 to 380,000.

Among the coupling agents that may be used, one may cite the agents of the epoxidised vegetable oil type, the epoxidised polybutadiene or even the epoxidised tetrallylether pentaerythritol. Polyepoxidised vegetable oils such as epoxidised soybean oil or epoxidised linseed oil comprising at least 3 epoxy groups per mole, preferably 4 to 6 epoxy groups per mole will preferably be chosen. They can thus couple at least 3 chains. The number of chains coupled by the epoxy groups of the coupling agent is a function of the ratio between the amount of base polymer and the amount of coupling agent. Preferably, 5 chains are coupled.

The amounts of coupling agent to be used can easily be calculated. Indeed, the reaction between a coupling agent having a molecular weight M, and a functionality n and S-B-Li chains of molecular weight $M_2$ carried out in a molar ratio of 1:n will theoretically give a copolymer of molecular weight $M_1+nM_2$ reduced by the molecular weight of the coupling by-product; deviations are due essentially to traces of impurities or to heat, which can, for example, deactivate the S-B-Li chains (giving copolymers with a molecular weight of about $M_2$, as found in the final product). The total amount of coupling agent used is calculated in order to couple all the S-B-Li chains, but less can be used if preservation of an increased proportion of the S-B copolymer in the final product is desired. In the present invention, the coupling ratio is preferably from 70 to 95%. It is also noted that the amount of coupling agent may vary with the epoxy group number.

Said coupling agent is in the liquid state and is introduced in the reactor in a solvent. Preferably, said solution contains 15 weight percent of coupling agent, 15 weight percent of THF and 70 weight percent of cyclohexane. It is then heated to a temperature of from 95 to 100° C., preferably around 97° C., under a pressure of from 4 to 8 bars, preferably around 6 bars. The coupling reaction takes from 0.1 to 1 hour.

The block coplymer formed according to this process is radial or polybranched.

The polymer can be recovered after the polyfunctional treating agent has formed the branched block copolymers. Recovery of the polymers can be performed by conventional methods used for recovering polymer from organometal polymerisation mixtures such as treatment with materials containing active hydrogen such as alcohols or aqueous acids.

It is observed, quite surprisingly, that the viscosity of the resulting S-B-S product is significantly reduced when the coupling agent is a polyepoxide compound. The final product is therefore an ideal candidate for numerous applications. It has been utilised quite successfully for roofing membranes, binder in road applications and footwear applications.

The following examples illustrate some of the possible uses of the composition of the present invention.

Roofing Application

A composition comprising 12 weight % of S-B-S block copolymer and 88 weight % of bitumen was prepared. The bitumen used in this composition was bitumen A of Table III.

The coupling agent was Vikoflex 7190 that is an epoxidised linseed oil characterised by 9.3% oxirane and 5.8 epoxy groups per mole. The percentage of coupling of the product was 77% and the styrenic content was 37 wt %. No oil was added to the mixture.

Comparative examples have been prepared using the same block copolymer and the same bitumen with the difference that $SiCl_4$ was used as coupling agent. Different percentages of coupling and/or styrenic content were used.

The product compositions and the results are presented in Table I.

TABLE I

|  | 1 | 2 | 3 | 4 |
|---|---|---|---|---|
| Coupling agent | $SiCl_4$ | $SiCl_4$ | Vikoflex | $SiCl_4$ |
| % coupling | 70 | 93 | 77 | 96 |
| % oil | 5 | −0 | 0 | 0 |
| % styrene | 31 | 31 | 37 | 36 |
| Toluene solution viscosity (TSV) mm²/s | 19.5 | 28.5 | 19.2 | 29.1 |
| Properties |  |  |  |  |
| Ring and ball temperature (° C.) | 118 | 126 | 132 | 134 |
| Penetration @ 25° C. (0.1 mm) | 58 | 49 | 58 | 49 |
| Cold bending temperature (° C.) | −40 | −38 | −34 | −32 |
| Working temperature range (° C.) | 158 | 164 | 166 | 166 |
| Viscosity at 160° C. (Pa.s) | 3.9 | 4.2 | 3.7 | 5.2 |
| Viscosity at 180° C. (Pa.s) | 1.8 | 1.8 | 1.6 | 2 |
| Flow at 100° C. and angle of 45° |  |  |  |  |
| 2h30 (mm) | 11 | 6 | 1.5 | 6 |
| 5h00 (mm) | 17 | 8 | 3 | 8 |
| 24h00 (mm) | 250 | 62 | 5 | 16 |

The following methods have been used to measure the properties appearing in this application:
Toluene Solution Viscosity: ASTM-D 445 revised 86.
Ring and Ball Temperature: ASTM-D 36.
Cold Bending Temperature: DIN 52123.
Viscosity: ASTM-D 2170 revised 89.

In Table I, the product of column 1, prepared with $SiCl_4$ as coupling agent, and the product of column 3, prepared with Vikoflex 7190 as coupling agent, have different styrenic and oil content in order to exhibit similar toluene solution viscosities (TSV), of 19.5 and 19.2 respectively. The product obtained with Vikoflex has a higher styrenic content: normally high styrenic percentage results in an improvement of mechanical properties but it increases the viscosity, thus making the product difficult to handle: this can be seen by comparing columns 2 and 4. Such behaviour is not observed with the Vikoflex product that exhibit simultaneously improved mechanical properties and low viscosity. Increasing the percentage of coupling also improves the mechanical properties but also increases the TSV and the viscosity, as, can be seen by comparing columns 1 and 2. The product obtained with Vikoflex as coupling agent keeps the Improved properties of the products obtained with $SiCl_4$, when high percentage of coupling and/or high percentage of styrene are utilised, without increasing the TSV and/or the viscosity. Comparing the properties of the products of column 1 and 3 indicates a substantial improvement in the ring and ball temperature, in the range of working temperatures, and quite surprisingly, at equivalent viscosities, a dramatic reduction of the flow, when Vikoflex is used as coupling agent.

Road Applications

Two binders for road applications have been prepared, one with the same bitumen A as in the roofing application and another one with a bitumen B described in Table III. These binder products comprised 5 weight percent of S-B-S bock copolymer and 95 weight percent of bitumen.

The coupling agent was Vikoflex 7190 as in the roofing application, the percentage of coupling was 77% and the styrenic content was 37 wt %. No oil was added to the mixture.

Comparative examples have been obtained using $SiCl_4$ as coupling agent. The product compositions and the results are summarised in Table II.

TABLE II

|  | 1 | 2 | 3 |
|---|---|---|---|
| Coupling agent | $SiCl_4$ | $SiCl_4$ | Vikoflex |
| % coupling | 70 | 93 | 77 |
| % oil | 5 | 5 | 0 |
| % styrene | 31 | 31 | 37 |
| TSV mm²/s | 19.5 | 25 | 19.2 |
| Properties of the product prepared with bitumen A | | | |
| Ring and ball temperature (° C.) | 88 | 87 | 92 |
| Penetration @ 25° C. (0.1 mm) | 94 | 90 | 105 |
| Viscosity at 135° C. (Pa.s) | 1.1 | 1.4 | 1.2 |
| Elastic recovery (%) | 87 | 95 | 97 |
| Properties of the product prepared with bitumen B | | | |
| Ring and ball temperature (° C.) | 59 | 59 | 64 |
| Penetration @ 25° C. (0.1 mm) | 92 | 93 | 97 |
| Viscosity at 135° C. (Pa.s) | 1.8 | 1.8 | 1.6 |
| Elastic recovery (%) | 80 | 94 | 95 |

The elastic recovery was measured using the ASTM-6084-97 technique. Comparing column 1 and column 3, it can be seen that, if the styrenic content of the final product obtained with Vikoflex is adjusted in order to obtain the same viscosity as that of the product obtained with $SiCl_4$, all the desired properties are substantially improved with the Vikoflex products. More particularly, the ring and ball temperature and the elastic recovery are increased.

Comparing column 2 and column 3, it is observed that, even if the percentage of coupling is increased for the product prepared with $SiCl_4$, the ring and ball temperature and the elastic recovery of the final products remain substantially better for the "Vikoflex" products. In addition, the viscosity of the product prepared with Vikoflex remains lower.

TABLE III

|  |  | BITUMEN A 180/200 | BITUMEN B 80/100 |
|---|---|---|---|
| Ring and ball temperature | ° C. | 36 | 47 |
| Penetration | 0.1 mm | 179 | 97 |
| Viscosity at 135° C. | Pa.s | <0.5 | <0.5 |
| Structure: | % | | |
| Saturated | % | 6.5 | 5.5 |
| Aromatics | % | 57.5 | 50.5 |
| Resins | % | 21 | 24.5 |
| Asphaltenes | % | 15 | 19.5 |

The penetration was measured using the ASTM-D 5 (revised 95) method.

Footwear Applications

Two compositions have been prepared: all the constituting components and quantities were identical except for the coupling agent that was either $SiCl_4$ for the comparative example or Vikoflex for the working example. The components, quantities given in weight percent, and properties of these two compositions are summarised in Table IV.

TABLE IV

| COMPOSITION | | | |
|---|---|---|---|
| S—B—S low styrene | | 7 | 7 |
| S—B—S (A) | | 12 | 12 |
| S—B—S (B) | | 15 | 15 |
| $SiCl_4$ | | 23 | — |
| Vikoflex | | — | 23 |
| Oil | | 28 | 28 |
| General purpose polystyrene | | 4 | 4 |
| High impact polystyrene | | 4 | 4 |
| $CaCO_3$ | | 7 | 7 |
| Properties | | | |
| Melt flow | g/10 min | 9 | 13 |
| Hardness Shore | — | 81 | 78 |
| Rebound | % | 31 | 32 |
| Density | g/cm³ | 0.9811 | 0.9800 |
| Abrasion | mm³ | 130 | 150 |
| Traction | | | |
| Rupture | Mpa | 6.0 | 4.6 |
| Elongation | % | 725 | 670 |
| Tensile strength (300% elongation) | Mpa | 3.26 | 3.06 |
| Tear | N/mm | 27.7 | 26.8 |

The following methods have been used for measuring the properties appearing in these examples:
Melt Flow (MI5): ASTM-D 1238 revised 89, at 190° C. and under a load of 5 kg.
Hardness Shore: ASTM-D 2240.
Rebound: DIN 53512.
Abrasion: DIN 53516.
Tensile: ASTM-D412, D 638, D 882
Tear: ASTM-D 624.

It is observed that, all other properties being equivalent, the melt flow rate of the product of the present invention, obtained using Vikoflex as coupling agent, is much higher than that prepared with $SiCl_4$. The product of the present invention will thus be easier to process and inject to form shoe soles.

What is claimed is:

1. An article of footwear comprising a shoe sole formed of a styrene butadiene block copolymer having a styrene content within the range of 15–45 wt. % coupled with an epoxidized vegetable oil.

2. The article of footwear of claim 1 wherein the styrene content of said styrene butadiene block copolymer is within the range of 35–39% by weight.

3. The article of footwear of claim 1 wherein said epoxidized vegetable oil has at least three epoxy groups per mole.

4. The article of footwear of claim 1 wherein said epoxidized vegetable oil has from 4 to 6 epoxy groups per mole.

5. The article of footwear of claim 1 wherein said epoxidized vegetable oil is selected from the group consisting of epoxidized soybean oil and epoxidized linseed oil.

6. The article of footwear of claim 1 wherein said epoxidized vegetable oil is epoxidized linseed oil.

7. A process for the preparation of a shoe sole for footwear comprising:
   (a) providing a polymer composition comprising a styrene butadiene block copolymer formulation coupled with an epoxidized vegetable oil, said polymer composition having a melt flow index greater than a corresponding polymer composition comprising said styrene butadiene block copolymer formulation coupled with silicon tetrachloride in an amount the same as the amount of said epoxidized vegetable oil coupling agent; and
   (b) using said polymer composition to form a footwear shoe sole.

8. The process of claim 7 wherein the styrene content of said styrene butadiene block copolymer is within the range of 15–45% by weight.

9. The process of claim 8 wherein said epoxidized vegetable oil has at least three epoxy groups per mole.

10. The process of claim 9 wherein said epoxidized vegetable oil is selected from the group consisting of epoxidized soybean oil and epoxidized linseed oil.

11. The process of claim 10 wherein said epoxidized vegetable oil has from 4 to 6 epoxy groups per mole.

12. The process of claim 11 wherein said epoxidized vegetable oil is epoxidized linseed oil.

13. The process of claim 12 wherein said epoxidized linseed oil is characterized by 9.3% oxirane and 5.8 epoxy groups per mol.

14. The process claim 13 wherein the styrene content of said styrene butadiene block copolymer is within the range of 35–39% by weight.

15. An article of footwear comprising a shoe sole formed of a styrene butadiene block copolymer coupled with an epoxidized linseed oil having at least three epoxy groups per molecule.

16. The article of footwear of claim 15 wherein said epoxidized linseed oil is characterized by 9.3% oxirane and 5.8 epoxy groups per mole.

* * * * *

UNITED STATES PATENT AND TRADEMARK OFFICE
CERTIFICATE OF CORRECTION

PATENT NO.    : 6,817,114 B2  
DATED         : November 16, 2004  
INVENTOR(S)   : Pierre Bredael and Fabienne Radermacher Page 1 of 1

It is certified that error appears in the above-identified patent and that said Letters Patent is hereby corrected as shown below:

Title page,  
Item [75], Inventors, -- Fabienne Radermacher -- should be added.

Column 1,  
Line 30, replace "block S. and" with -- block S, and --.

Column 2,  
Line 32, replace "piplerylene" with -- piperylene --.

Column 5,  
Line 9, replace "the Improved properties" with -- the improved properties --.

Signed and Sealed this

Thirtieth Day of August, 2005

JON W. DUDAS  
*Director of the United States Patent and Trademark Office*